(12) United States Patent
Ovadia

(10) Patent No.: US 11,606,447 B2
(45) Date of Patent: *Mar. 14, 2023

(54) SMART REMOTE AGENT ON AN ACCESS CPE WITH AN AGILE OPENWRT SOFTWARE ARCHITECTURE

(71) Applicant: Charter Communications Operating, LLC, St. Louis, MO (US)

(72) Inventor: Shlomo Ovadia, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,140

(22) Filed: Nov. 4, 2021

(65) Prior Publication Data
US 2022/0131951 A1    Apr. 28, 2022

Related U.S. Application Data

(63) Continuation of application No. 17/007,584, filed on Aug. 31, 2020, now Pat. No. 11,196,841.

(60) Provisional application No. 63/061,107, filed on Aug. 4, 2020.

(51) Int. Cl.
| | |
|---|---|
| *G06F 15/173* | (2006.01) |
| *H04L 67/75* | (2022.01) |
| *H04L 67/12* | (2022.01) |
| *H04L 43/0864* | (2022.01) |
| *H04W 80/12* | (2009.01) |
| *H04L 67/01* | (2022.01) |
| *H04L 67/562* | (2022.01) |

(52) U.S. Cl.
CPC ......... *H04L 67/75* (2022.05); *H04L 43/0864* (2013.01); *H04L 67/01* (2022.05); *H04L 67/12* (2013.01); *H04L 67/562* (2022.05); *H04W 80/12* (2013.01)

(58) Field of Classification Search
CPC ....... H04L 67/75; H04L 67/01; H04L 67/562; H04L 67/12; H04L 43/0864; H04W 80/12
See application file for complete search history.

(56) References Cited

U.S. PATENT DOCUMENTS

| | | | |
|---|---|---|---|
| 11,196,841 B1* | 12/2021 | Ovadia | H04L 43/065 |
| 11,372,395 B2* | 6/2022 | Celia | G05B 23/0283 |
| 2018/0302303 A1 | 10/2018 | Skovron et al. | |
| 2020/0159607 A1 | 5/2020 | Piaseczny et al. | |

* cited by examiner

*Primary Examiner* — Alicia Baturay
*Assistant Examiner* — Joseph R Maniwang
(74) *Attorney, Agent, or Firm* — The Marbury Law Group, PLLC

(57) ABSTRACT

Systems and methods of a smart and efficient agent integrated with an agile software architecture to collect and present telemetry data from a field deployed device. The collected telemetry data from the field deployed device is streamed to the service provider's streaming and analytics platform, where it is analyzed and presented to a hierarchical color-coded dashboard that is available to both the customer associated with the field deployed device, and the service provider's care agent associated with the field deployed device.

17 Claims, 10 Drawing Sheets

SMART REMOTE AGENT ON AN ACCESS CPE WITH AN AGILE OPENWRT SOFTWARE ARCHITECTURE

RELATED APPLICATIONS

This application is a continuation of U.S. application Ser. No. 17/007,584, entitled "Smart Remote Agent on an Access CPE with an Agile OpenWrt Software Architecture" filed on Aug. 31, 2020, which claims the benefit of priority to U.S. Provisional Patent Application No. 63/061,107 entitled "Smart Remote Agent on an Access CPE with an Agile OpenWrt Software Architecture", filed on Aug. 4, 2020, the entire contents of both of which are hereby incorporated by reference for all purposes.

BACKGROUND

Wireline and wireless communication technologies have seen dramatic improvements over the past few years. Service providers now offer users a wide array of services, higher usage limits, and attractive subscription plans. Wireless dongles and embedded wireless modem cards allow users to use tablet computers, netbooks and laptops to access Internet protocol (IP) and data services through wireless networks. Internet-enabled smart phones, tablets, televisions, and gaming consoles have become essential personal accessories, connecting users to family, friends, work, leisure activities and entertainment. Users now have more choices and demand to have continuous and uninterrupted access to content, data and communications at any time.

The proliferation of these new services has increased the complexity of using IP devices and managing home networks. To help users manage this complexity, service providers now provide their customers/users with applications and other web-based systems that allow customers/users to look up information and self-manage their networks. Despite the availability of such operator applications and web-based systems, customers/users still do not have meaningful visibility into their home networks and/or cannot readily analyse data available on their networks. As a result, customers/users continue to rely on human operators and/or customer service centres. Consequently, service providers are forced to utilize expensive customer service vendors and/or maintain robust customer service departments that use human or labour-intensive procedures to interact with the customers (e.g., answer their questions, manage their accounts, etc). These customer service centers/venders often contribute significantly to the overhead/operating expenses of an enterprise (e.g., service providers, etc.) and/or prevent service providers from offering their customers with additional services or more cost efficient services.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
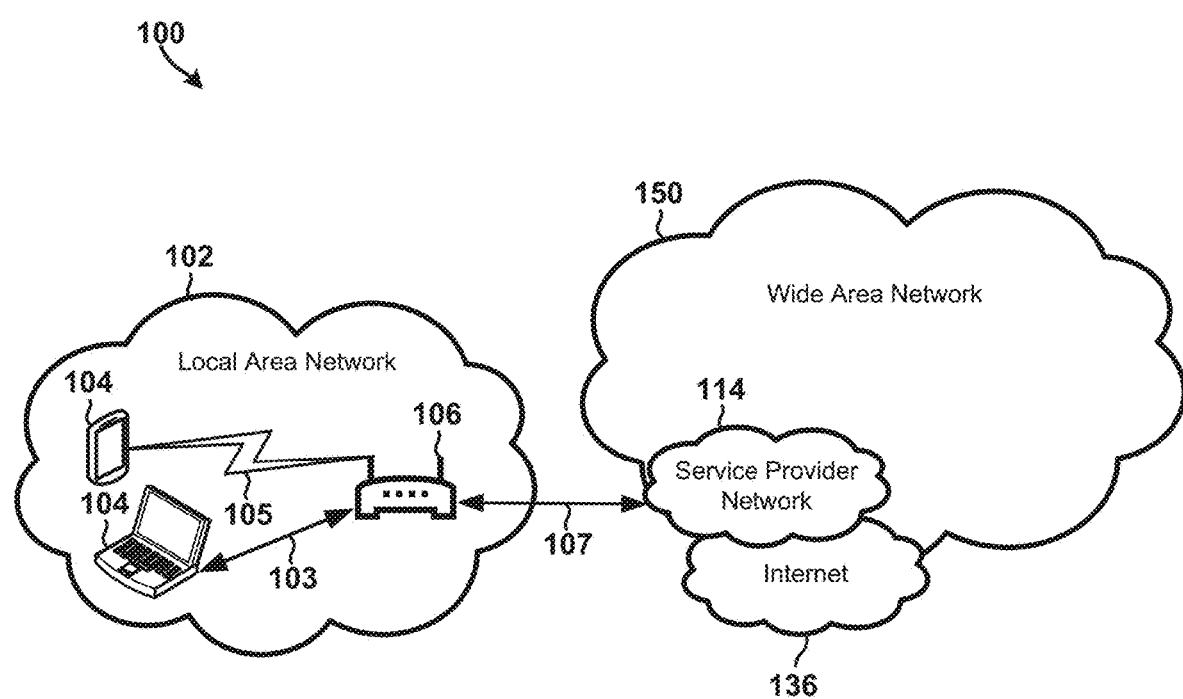
FIG. 1A is a block diagram of the customer's home network connected to the service operator's network suitable for use with some embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and computing devices configured to implement the methods, for using an agile software architecture to stream telemetry data from a field deployed device to an analytics streaming platform that is available both to a service provider's customer care agent as well as to the service provider's customers.

The various embodiments allow for the network service provider to install functionality that provides both the customer and the service provider with visibility into any or all of the data and communication traffic and applications executing in the home network. The various embodiments allow the end-to-end communication system to use telemetry information more effectively in order to get, use or generate a full real time matrix of network performance (e.g., speed tests, packet loss, delay, etc.). The various embodiments also allow for the installation and use of applications that provide improved network security, performance monitoring, and/or law enforcement functions.

The term "service provider network" is used generically herein to refer to any network suitable for providing consumers with access to the Internet or IP services over broadband connections. Service provider networks may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-135/TDMA), evolution-data optimized (EV-DO), digital enhanced cordless telecommunications (DECT), Worldwide Interoperability for Microwave Access (WIMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC also may include any number of general purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. SoCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard, in a single UE, or a single CPE device. The proximity of the SoCs facilitates high speed communications and the sharing of memory and resources.

The term "multicore processor" may be used herein to refer to a single integrated circuit (IC) chip or chip package that contains two or more independent processing cores (e.g., CPU core, graphics processor unit (GPU) core, etc.) configured to read and execute program instructions. A SoC may include multiple multicore processors, and each processor in an SoC may be referred to as a core. The term "multiprocessor" may be used herein to refer to a system or device that includes two or more processing units configured to read and execute program instructions.

Many customers or subscribers to a service provider's network connect to the Internet via a customer premise equipment (CPE) component/device. A CPE device may include a cable modem, digital subscriber line modem, router, switch, firewall, packet filter, wireless access point, and/or a residential gateway that provide network connectivity to home or small office network. In particular, a CPE device may allow UE devices on the local area network (LAN) to connect to a wide area network (WAN) and ultimately the Internet.

The terms "STeMTA," "STLANeMTA," "eMTALat," "usCeMTA," "dsCeMTA," "latClient," and "connClient" may be used in this application to refer to different plugins/components that may be included in a field deployed device (e.g., Access CPE device, etc.). For example, "STeMTA" may be a plugin code name for the Access CPE device's speed test results via the WAN port, "STLANeMTA" may be a plugin code name for the Access CPE device's speed test results via the LAN port, "eMTALat" may be a code name for the plugin that first measures and then reports the Internet Protocol version 4 (IPv4) and Internet Protocol version 6 (IPv6) DOCSIS round-trip latency between an access CPE and a connected CMTS, "usCeMTA" may be a code name for the plugin that provides the cable modem upstream channel information, "dsCeMTA" may a code name for a plugin that provides cable modem downstream channel information, "latClient" may be a code name for a plugin that first measures and then reports between a UE and an access CPE, "connClient" may be a code name for a plugin that first measures and then reports the number of transmitted and received packets in a given period of time by a UE.

Some cable Multiple System Operators (MSOs) deploy a two-box solution for both residential and Small and Medium-size Business (SMB) customers where one box is an access CPE device (i.e., cable modem, ONU, etc.), and the second box is a wireless router. Cable operators typically have limited information about the access CPE device's health status, and no information about the customer's home network, including what type of clients are connected to the home network, and their bandwidth usage vs. time. Such home network health and traffic information would be very useful to the cable operators. For example, cable operators could use such information enhance their customers' experience by optimizing the customer's home network traffic, preventing potential field issues, and introducing new services such as customer's home network management and security.

The various embodiments include components configured to collect, analyze, organize and/or render home network health and traffic information so as to allow cable operators to enhance their customers' experience by optimizing the customer's home network traffic, preventing potential field issues, and facilitating the introduction of new services such as customer's home network management and security. In addition, the various embodiments improve the performance, efficiency and functioning of the service provider network and the components/devices that are included in, utilize, or benefit from the service provider network. The improvements to performance and functioning of the communication system and its constituent network components will be evident from the disclosures below.

FIG. 1A is a simplified block diagram that provides an example of a network 100 that may be used to implement the various embodiments. In the example illustrated in FIG. 1A, the network 100 includes a local area network (LAN) 102 and a wide area network (WAN) 150. The LAN 102 includes user equipment (UE) 104 devices (e.g., laptop, mobile phone) coupled to a field-deployed customer premise equipment (CPE) 106 device via wired 103 and wireless 105 communication links. The CPE 106 includes communication links 107 to a service provider network 114 within the WAN 150 that allow the UE 104 devices to send and receive information to and from the Internet 136. In some embodiments, the CPE 106 may include a cable modem that operates as a network bridge that provides bi-directional data communication via radio frequency channels on a hybrid fiber-coaxial (HFC) and/or radio frequency over glass (RFoG) infrastructure.

In some embodiments, a cable modem termination system (CMTS) component may be deployed in a headend or in a network node, and configured to facilitate high speed communications between the CPE 106 and the components within the service provider network 114.

The service provider network 114 may include various network components for providing consumers with access to the Internet 136 or IP services over broadband connections. In some embodiments, the CPE 106 may include an Optical Network Unit (ONU) that operates as a network bridge that provides bi-directional data communication via Passive Optical Network (PON). In some embodiments, an Optical Line Terminal (OLT) component may be deployed in a headend or in a fiber node, and configured to facilitate high speed communications between the CPE 106 and the components within the service provider network 114. In some embodiments, the access CPE device 106 may include a 10G EPON S-ONU hardware and a corresponding software stack suitable for broadband Internet access. In some embodiments, the access CPE device 106 may include a Gigabit PON ONU hardware and a corresponding software stack suitable for broadband Internet access.

Figure 1B:
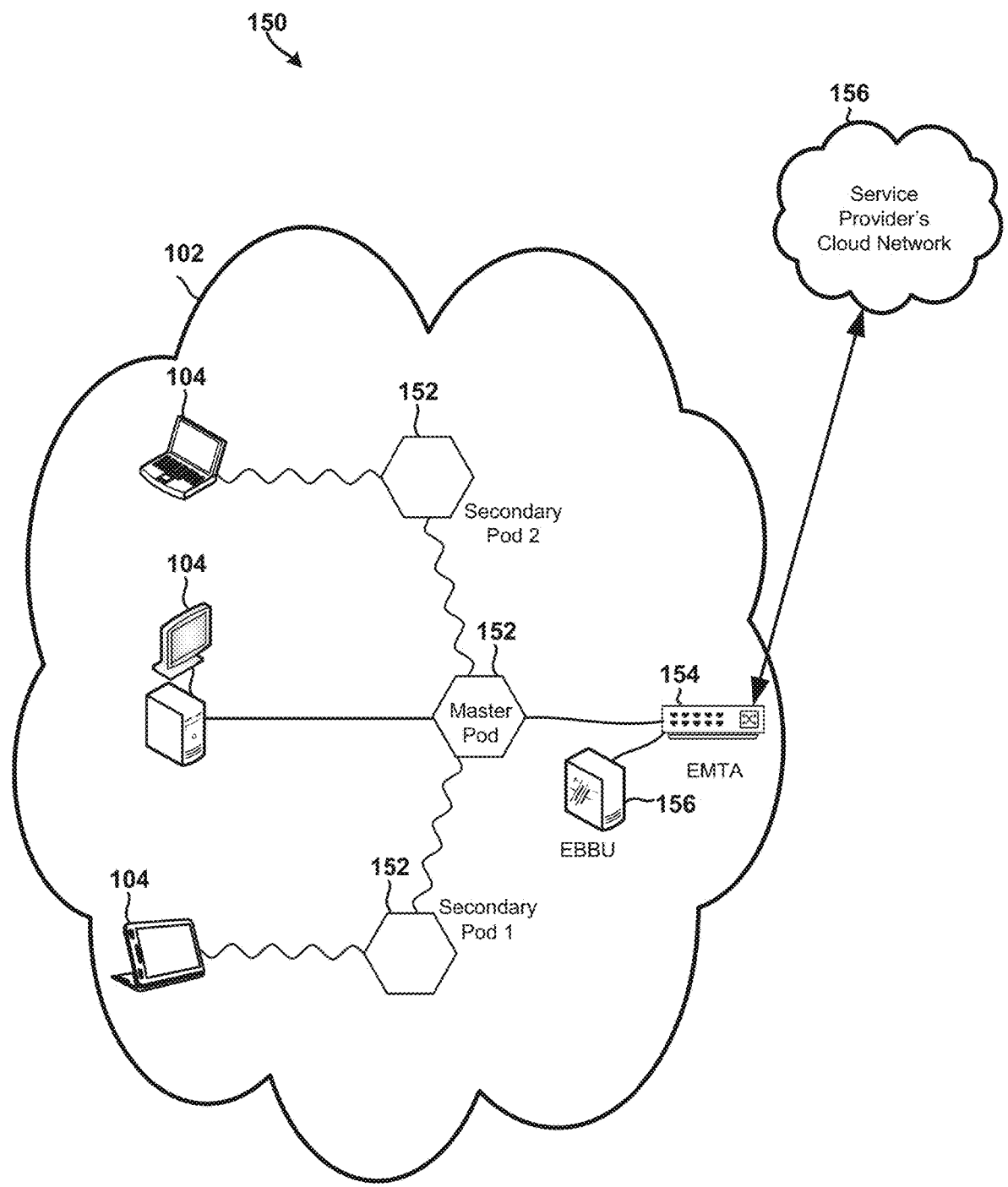
FIG. 1B is a block diagram of home network where the access CPE device is connected one or more Wi-Fi routers/Aps.

FIG. 1B is an illustration of a wireless mesh home network 150 that may be used to implement the various embodiments. In the example illustrated in FIG. 1B, the UE 104 devices (e.g., laptop, desktop computer, tablet) connect to pods 152 (or Wi-Fi routers, Wi-Fi extenders, etc.) that are coupled to an embedded multimedia terminal adapter (eMTA) 154 that is configured to communicate with the service operator's cloud and/or OpenSync™ network 156. Each of the pods 152 may be a Wi-Fi access point, Wi-Fi extender, or other similar device. The eMTA 154 may be a combination cable modem and telephone adapter. The UE 104 devices, pods 152 and cable modem eMTA 154 may all be included in the same LAN 102. The pods 152 and/or cable modem eMTA 154 may be included in a CPE device 106.

The cable modem eMTA 154 may be an OpenWrt-based D3.1 eMTA router, and the pods 152 may be wireless APs/extenders for mesh networking. For example, the cable modem eMTA 154 may provide IPv4/v6 routing functionality and the pods 152 may act as the Wi-Fi access points (APs) for all the customer's UE 104 devices.

Figure 2:
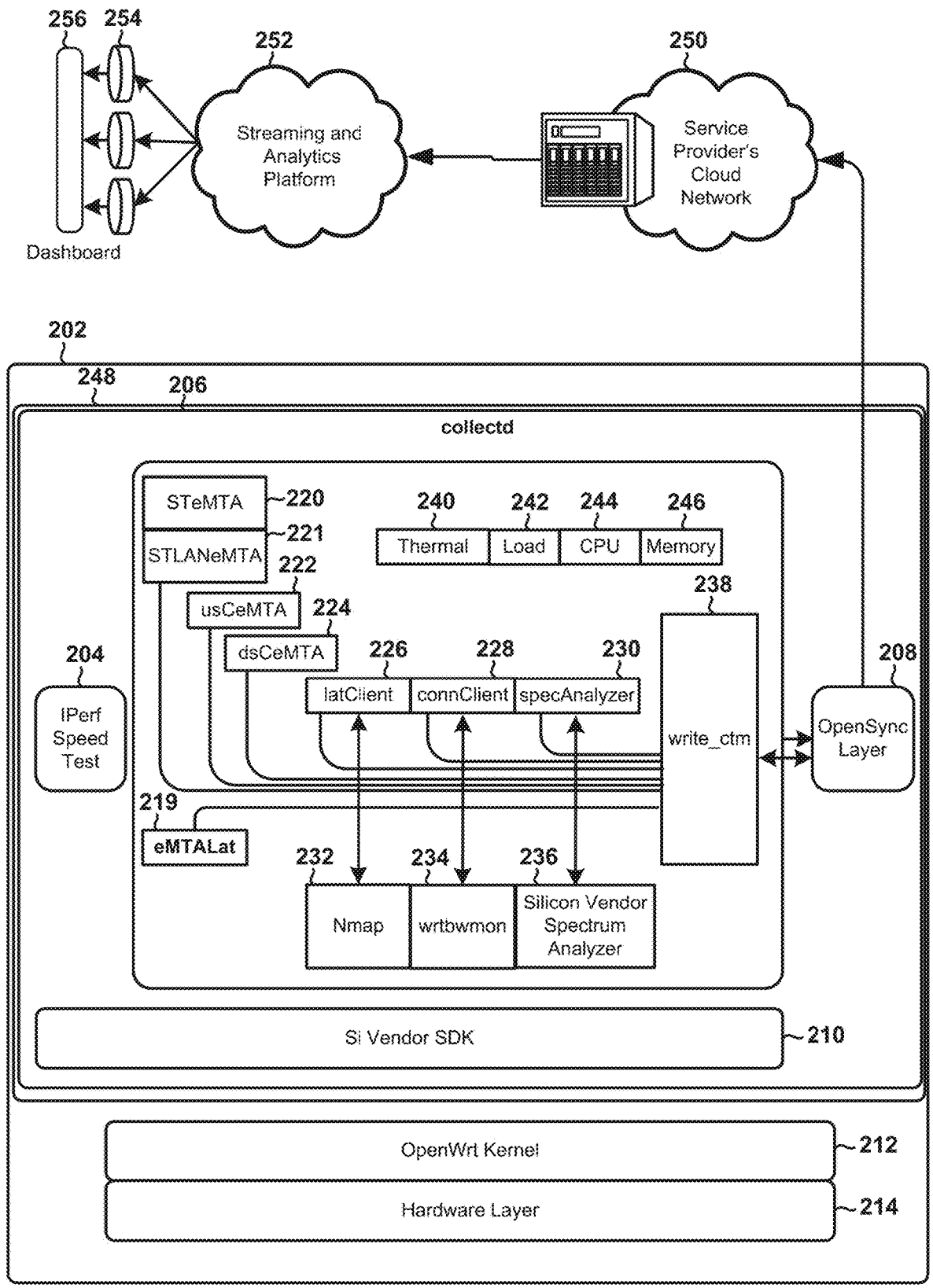
FIG. 2 is a block diagram of an example field deployed device (CPE device, eMTA, etc.) that is equipped an agile software architecture and which may be configured to stream telemetry data to an analytics analytic streaming platform that is available both to a customer care agent and the customer in accordance with the various embodiments.

FIG. 2 illustrates an example field deployed device 202 (e.g., CPE device 106, cable modem eMTA 154, ONU, etc.) equipped an agile software architecture and configured to stream telemetry data to an analytics streaming platform that is available both to a service provider's customer care agent as well as the service provider's customer in accordance with some embodiments. In the example illustrated in FIG. 2, the field deployed device 202 includes an application layer 248, an OpenWrt kernel 212 and a hardware layer 214. The application layer 248 includes an iPerf speed test 204 component, a collectd 206 component, an OpenSync™ Layer 208, and a silicon vendor software development kit (Si Vendor SDK) 210.

The iPerf speed test 204 component may be configured to measure downstream and upstream throughput on the WAN interface of the field deployed device 202.

The collectd 206 component may be an OpenWrt data collector that offers a variety of Plugins (software programs), and may be used to collect different types of telemetry data (e.g., from a router). The collectd 206 component may also gather metrics from other various sources, such as the operating system, applications, log-files and external devices. The collectd 206 component may store the information (metrics) and/or stream the collected metrics to the service provider's network via the OpenSync™ layer. The collected metrics (or statistics computed based on the metrics) may be used to monitor systems, find performance bottlenecks (i.e. performance analysis) and predict future system behavior such as system load using for example Machine Learning (ML) tools.

The various embodiments add new capabilities and functionality to the collectd 206 component, which may be integrated with the Si vendor SDK 210 and supported by the OpenWrt kernel 212. These new capabilities and/or new functionality may be provided by a STeMTA 220, STLANeMTA 221, a eMTALat 219, a usCeMTA 222 component, a dsCeMTA 224 component, a latClient 226 component, a connClient 228 component, a specAnalyzer 230 component, a network mapper (Nmap) 232 component, a wrtbwmon 234 component, a Silicon vendor's SDK spectrum analyzer 236 component, a write_ctm 238 component, a thermal 240 component, a load 242 component, a CPU 244 component, and a memory 246 component.

Each of these components 220-246 may be configured to collect telemetry data from the field deployed device 202 and customer home network, and stream the telemetry data to the service operator's streaming and analytics platform 252, which is ingested by different data analytics tools (e.g., MySQL, ELK) 254 and a displayed on a dashboard 256, via a the service operator's cloud network 250. The service operator's cloud network 250 may be an OpenSync™ Cloud that is configured to provide various command and control services, including network status, IP address, network mask, DHCP status, parental control, speed test initiation and results, reset and reboot device, etc.

Each of the eMTALat 219, STeMTA 220 component, STLANeMTA 221 component, the usCeMTA 222 component, the dsCeMTA 224 component, the latClient 226 component, the connClient 228 component, and the specAnalyzer 230 component may be communicatively coupled to the write_ctm 238 component. The latClient 226 component, the connClient 228 component, and the specAnalyzer 230 component may each be communicatively coupled to the Nmap 232 component, the wrtbwmon 234 component, and the Silicon vendor SDK spectrum analyzer 236 component. The OpenSync™ Layer 208 may be configured to enable OpenSync™ command and control connectivity to the operator's cloud network 250 via integrated OpenSync™ target layer.

The usCeMTA 222 component and dsCeMTA 224 component may be configured to pull all the DOCSIS upstream and downstream channel information used by the field deployed device 202 (RF level, channel frequency, etc.), which may then be streamed to the dashboard 256.

The latClient 226 component may be configured to measure and report the round-trip latency between each of the UE 104 devices and the Access CPE 154 in the home network.

The connClient 228 component may be configured to obtain the number of transmitted and received packets from the UE 104 devices.

The specAnalyzer 230 component may be configured to obtain the RF downstream and upstream spectrum within the selected frequency range (i.e., start and stop frequencies) of the field deployed device 202 (e.g., access CPE device, etc.).

The wrtbwmon 234 component may be configured to provide per user bandwidth monitoring capabilities and generate usage reports.

The Nmap 232 component may be configured to perform various network discovery and security auditing. The Nmap 232 component may also be used for tasks such as network inventory, managing service upgrade schedules, and monitoring host or service uptime. The Nmap 232 component may use raw IP packets to determine what hosts are available on the network, what services (application name and version) those hosts are offering, what operating systems (and OS versions) they are running, what type of packet filters/firewalls are in use, and dozens of other characteristics.

The thermal 240 component, load 242 component, CPU 244 component, and the memory 246 component may be supported plugins. The thermal 240 component may be configured to collect and report SoC temperatures of the deployed device 202. The CPU 244 component may be configured to collect the CPU utilization of Access CPE device 154 in the selected period of time. This includes various CPU activities, including executing system code, waiting for IO-operations and being idle. The load 242 component may be configured to collect the system load, which identifies the number of runnable tasks in the run-queue and may be provided by many operating systems as a one, five or fifteen-minute average. The system load numbers may give a rough overview over the utilization of a machine. The memory 246 component may collect information regarding the dynamic random access memory (DRAM) utilization, which may be reported by their use by the operating system. It should be pointed out that the smart remote agent on the access CPE device (field deployed device 202) may include a remotely configurable schedule plan for how often each of the collectd plugins reports changes either in the access CPE system and the home network.

In addition to added components 220-246, in some embodiments, the field deployed device 202 may be equipped with extended managers that collect and stream metric, statistics and other information to the dashboard 256 component.

Figure 3:
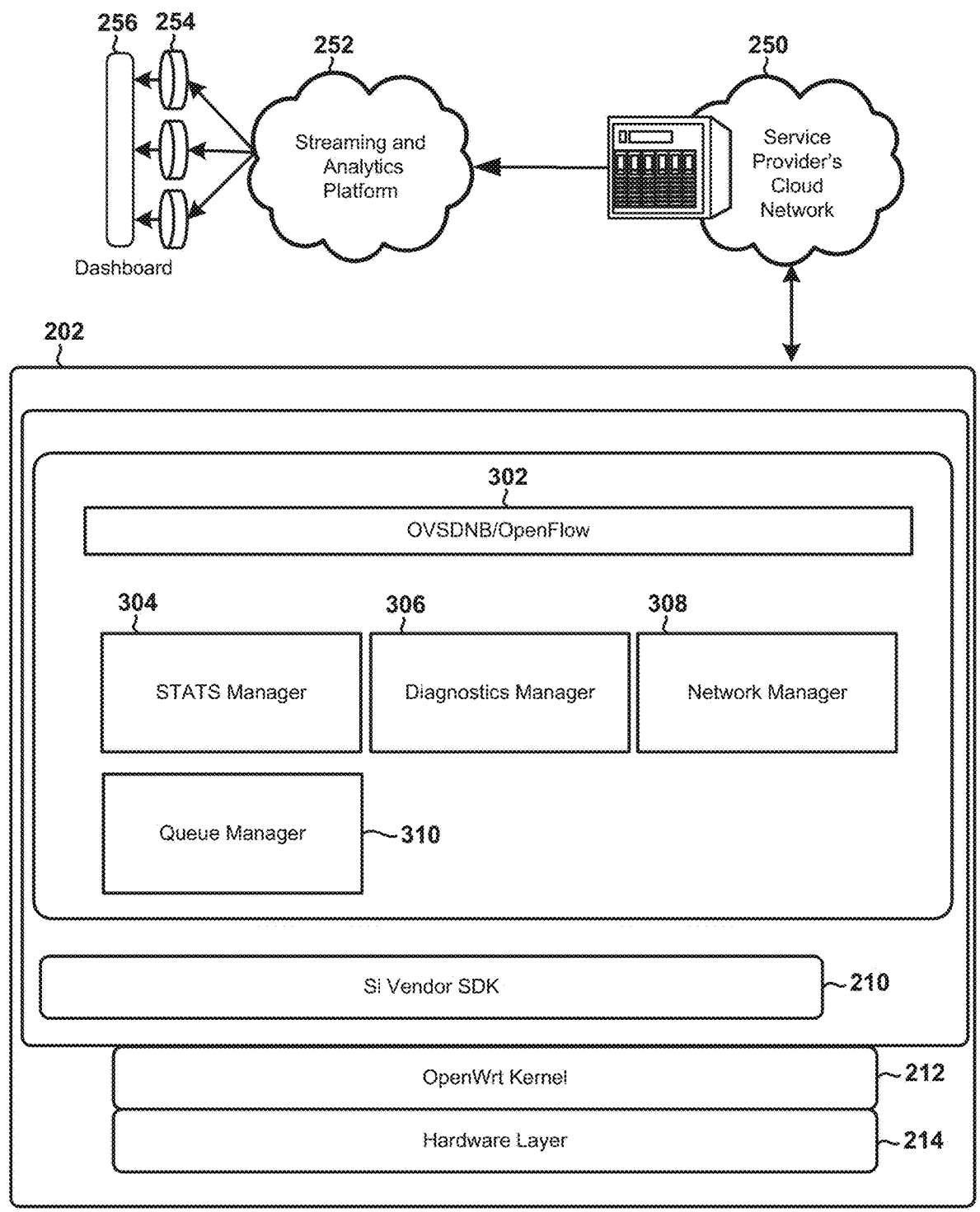
FIG. 3 is a block diagram of a field deployed device (CPE device, eMTA, etc.) configured with managers suitable for collecting and streaming telemetry data to an analytics analytic streaming platform in accordance with some embodiments.

FIG. 3 illustrates that the field deployed device 202 that includes extended managers. In particular, FIG. 3 illustrates an example in which the field deployed device 202 includes an OpenSync™ layer for command and control and telemetry. The OpenSync™ layer consists of an Open vSwitch Data Base (OVSDB)/OpenFlow 302 component, a Statistics (STATS) Manager 304, a Diagnostics Manager 306, a Network Manager 308, and a Queue Manager 310. In addition, the field deployed device 202 may include a connection manager, a Wireless Manager, a band steering manager, a Log Manager, an OpenFlow Manager, and/or a Platform Manager.

The service operator's cloud network 250 may provide OpenSync™ Cloud command and control, which may use OpenSync™ to connect the field deployed device 202 to the services running in the cloud via the OpenFlow protocol.

Each of the managers 304-314 may run as separate processes and perform specific tasks. The integrated OpenSync™ may include specific APIs for both the Diagnostics Manager 306, a Network Manager 308, and service provider's OpenSync™ patches in order to enable the field deployed device 202 to communicate with the service provider cloud network 250. The integrated OpenSync™ may enable all the collectd software plugins to stream their input data to the STATS Manager 304, and for STATS Manager to communicate with a Queue Manager and schedule and transmit all the data telemetry to the dashboard 256 via the service provider's cloud network 250.

The STATS Manager 304 may be responsible for processing all requested wired and wireless statistics and sending results to the service operator's cloud network 250. The configuration may be done through OVSDB 302, and the message queuing telemetry transport (MQTT) may be used for data plane communications. Telemetry health metrics mentioned may be collected by write_ctm component 238, and are transmitted to the statistics manager 304, which may forward all the collected telemetry data to the Queue Manager 310.

The Diagnostics Manager 306 may be responsible for spawning the rest of the OpenSync™ managers and optionally monitoring them. In some embodiments, the iPerf speed test 204 component may be integrated into the Diagnostics Manager 306 such that the speed test can be initiated from field deployed device 202 or from the service operator's Network Operations Center (NOC), and the downstream/upstream speed test results may be sent to dashboard 256.

Some embodiments may integrate a smart remote agent on field deployed device 202 that provides streaming data telemetry, alarms, and event notifications to the customer and the customer care agent via the dashboard 256 component.

Figure 4A:
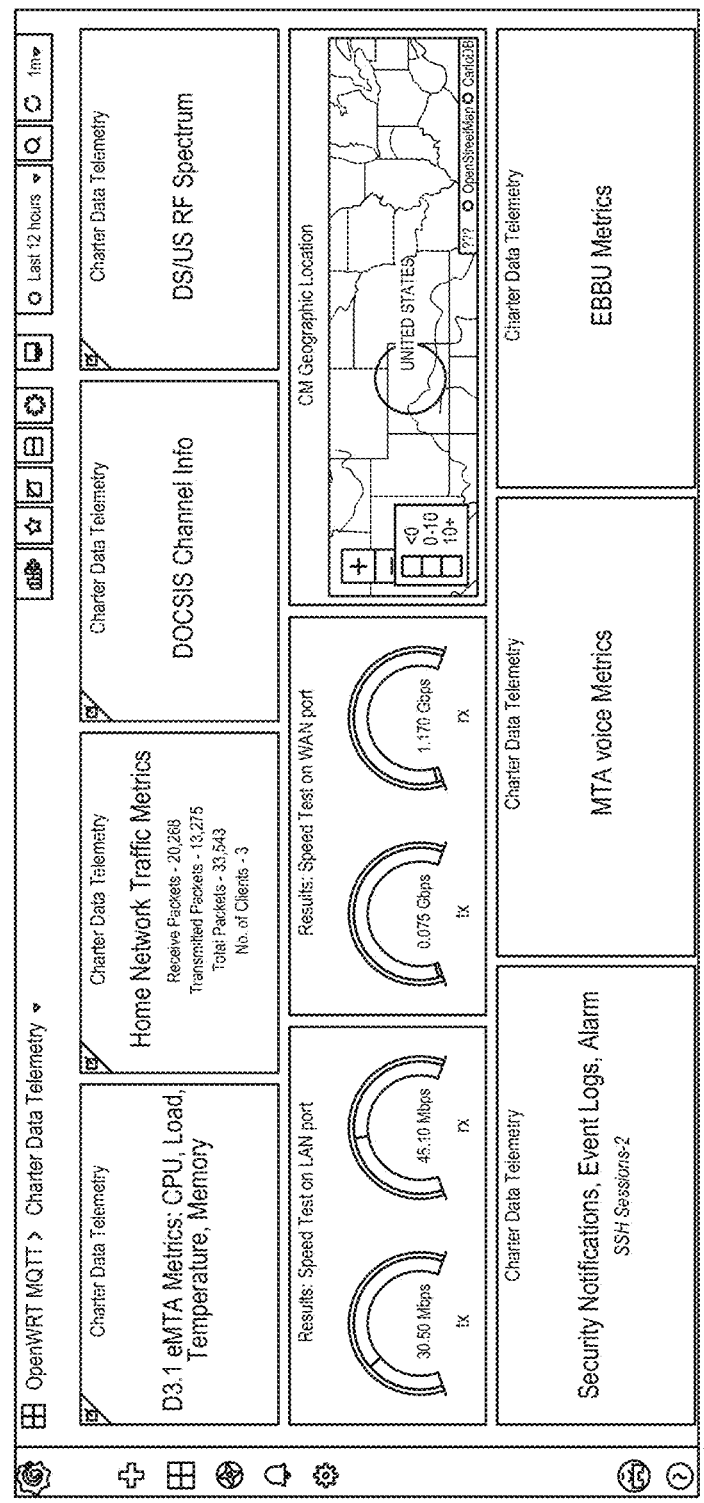
FIGS. 4A and B are illustrations of user interface screens of a dashboard component that may be made available both to a customer care agent and the customer in accordance with some embodiments.
Figure 4B:
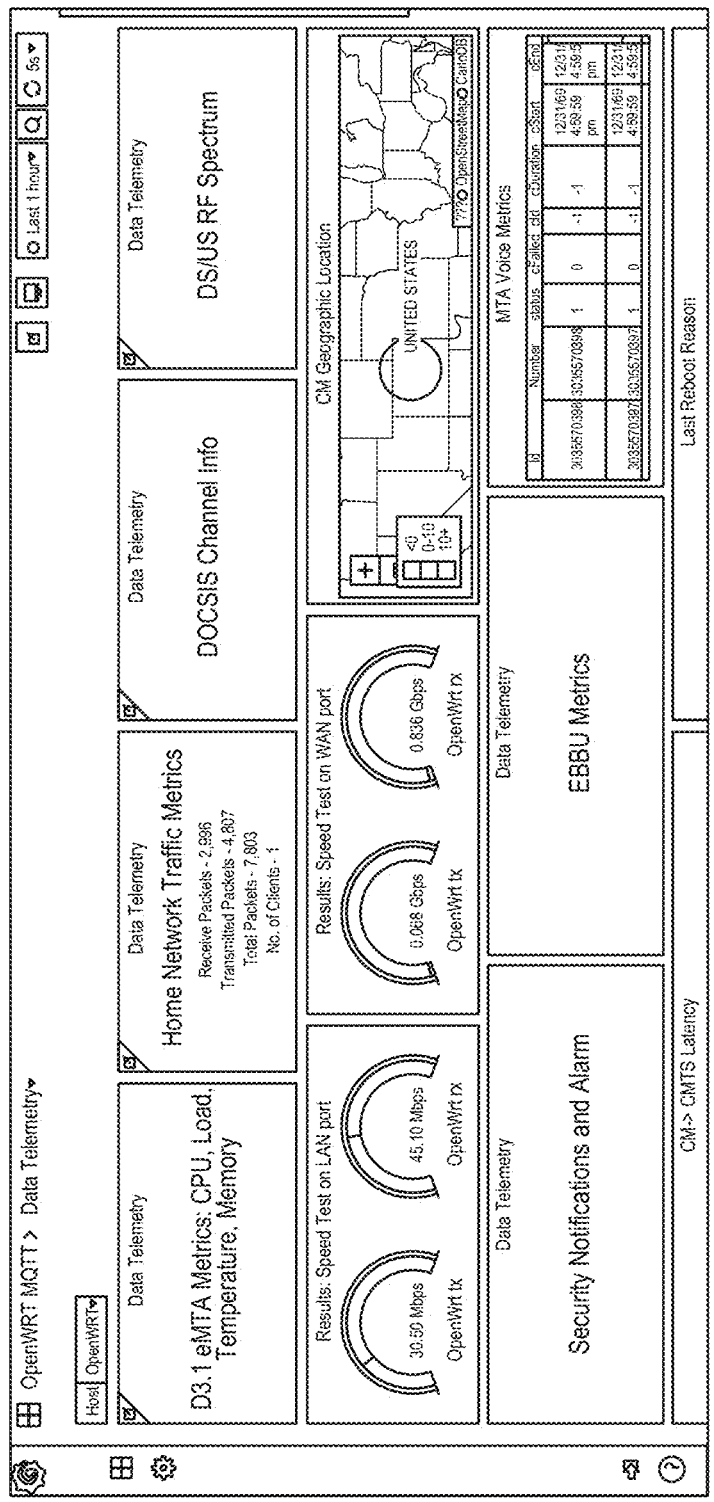

FIG. 4A-B illustrate example user interface screens 400, 420 each of which may be organized as a hierarchical color-coded dashboard with the key components, health metrics, and their operational status based on pre-determined threshold levels that could be displayed by the dashboard 256 component. Level 1 information may include information for the entire group of metrics. Level 2 may be the health status of each metric in the group. Level 3 may include a time variation of the selected metric.

The user interface screen 400 may display home network traffic metrics collected from all the wirelessly connected devices via the pods or Wi-Fi Access Points (e.g., Tx/Rx data packets for each device, RT latency, etc.). The user interface screen 400 may also display any or all of router system information, RF downstream and upstream spectrum information, cable modem downstream/upstream channel information, event/alarm information, a customer location map, speed test information, voice health metrics, external battery backup unit (EBBU) metrics, and access CPE device information.

The access CPE and router system information may include CPU utilization in a selected period of time, free memory in a selected period of time, system load in a selected period of time, networking information (e.g., IP address, network mask, DHCP status, etc.), instantaneous and average system temperatures, average, minimum and/or maximum RT IPv4 and IPv6 latency in a selected period of time to the CMTS.

The cable modem downstream/upstream channel information may include downstream channel info (e.g., channel ID, channel type, lock status, channel bonding status, received power level, SNR/MER, channel center frequency, channel width, modulation profile ID, etc.) and/or upstream channel info (e.g., channel ID, transmit power level, channel center frequency, channel width, channel bonding status, etc.).

The event/alarm information may include collected metrics alarms where one or more red thresholds were violated (e.g., if the temperature of the device is significantly elevated, and the device is about shut-down or go into energy saving mode, etc.) and/or security notifications (e.g., if someone is trying to temper with the Access CPE via unauthorized access to the device's management and control GUI via SSH, etc.).

The customer location map may provide the customer care agent information identifying where the customer is located within service provider's service area footprint.

The speed test information may include downstream/upstream speed test results on the WAN or LAN ports.

The voice health metrics may include phone line number, phone status (on/off hook), phone line IPv4 address, phone line IPv6 address, voice call start time, voice call end time, voice call duration, voice call failed, phone line registration status, etc.

The EBBU metrics may include health metrics, manufacturer identity, hardware model number, software agent version, battery status, EBBU output voltage, estimated remaining charge capacity, alarm description (e.g., on battery, low battery, depleted battery, EBBU shutdown in pending, EBBU shutdown is eminent, etc.).

The access CPE device system level 2 information may include a hardware version, software version, cable modem MAC address, cable modem serial number, IPv4 address, IPv6 address, cable modem system uptime, cable modem security status/type, cable modem connectivity state status/type, etc. In some embodiments, the user interface screen 400 also display level 2 information, which may include the health status of the specific reported metrics in level 1 based on pre-determined threshold levels.

In some embodiments, the user interface screen 400 also display level 3 data telemetry that shows the time behavior of each of the selected metrics in any given time frame. In some embodiment, artificial intelligence (AI) models may be executed on the selected customer data based on his historical data to determine whether the current report issue previously occurred and propose suggest how to mitigate the issue.

Figure 5:
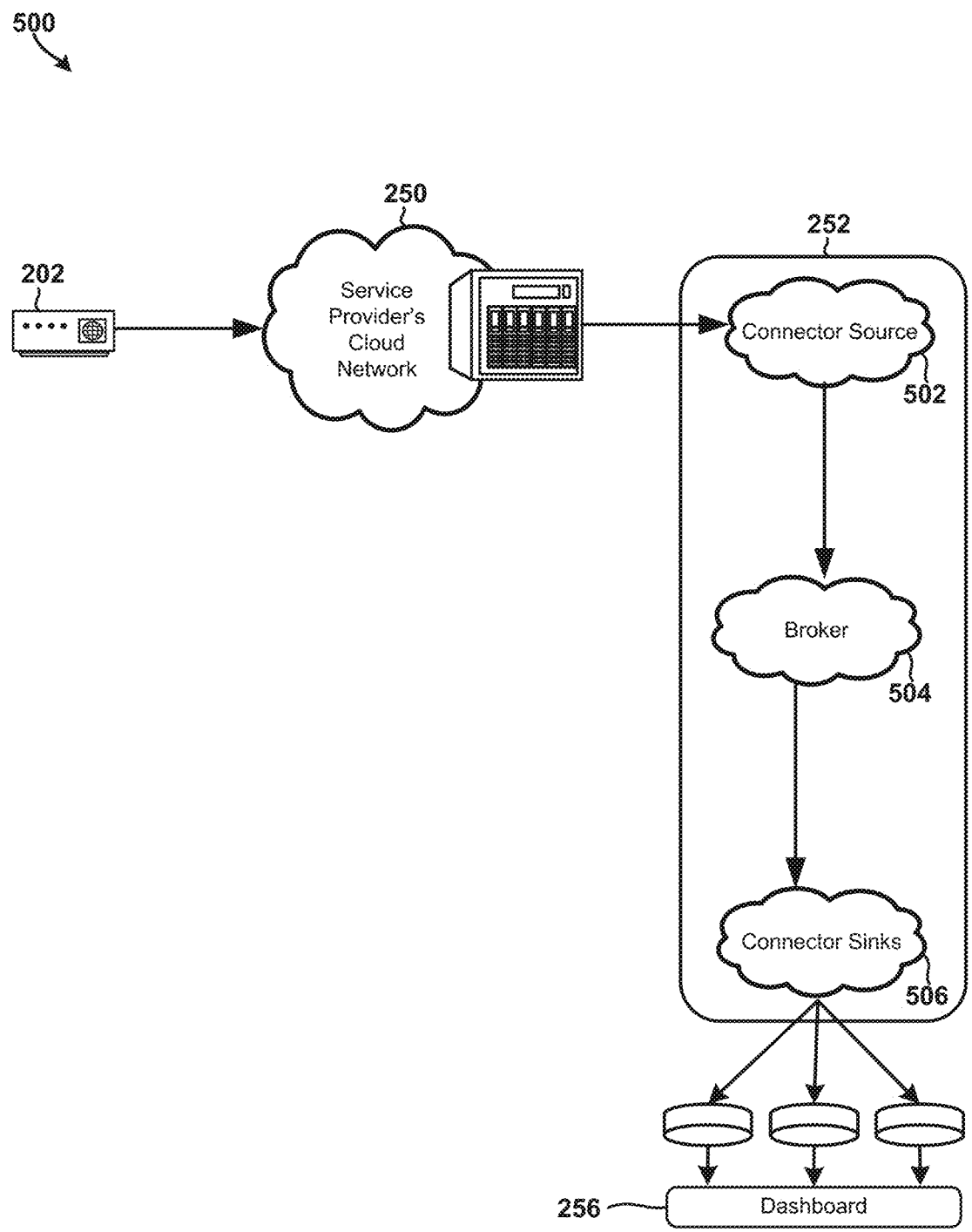
FIG. 5 is a component block diagram illustrating operations, communication links and information flows in a system configured to stream telemetry data from a field deployed device to an analytics analytic streaming platform that is available both to a customer care agent as well as to the customers in accordance with the embodiments.

FIG. 5 illustrates operations, communication links and information flows in a system 500 configured to stream telemetry data from a field deployed device to the service provider's analytics analytic streaming platform that is available both to a customer care agent as well as to the customers via the service operator's app in accordance with the embodiments.

With reference to FIGS. 1-5, the field deployed device 202 (e.g., CPE device 106, cable modem eMTA 154, etc.) may register a thermal 240 component with a collectd 206 component to read the system temperature data using the plugin_register_init( ) API. At startup, the collectd 206 component may invoke the thermal 240 component, which may use the thermal_read( ) API to read temperature data from the field deployed device 202. The collectd 206 component may submit the data using thermal_submit( ) API, which may be read by registered write plugins such as the write_ctm 238 component. The field deployed device 202 may register the write_ctm 238 component with the collectd 206 component via plugin_register_write( ) API, which may collect and submit the data at specified intervals. After receiving data, the write_ctm 238 component may serialize the data using a Protocol Buffer (Protobuf) method. Protocol Buffers (Protobuf) is a method of serializing structured data, and it is useful for developing programs that communicate with each other over a wire and/or for storing data. After serializing the data, the write_ctm 238 component may send the serialized data to a local or remote diagnostics manager. The diagnostics manager many receive the data in a ctm_stats_thread( ) read the reads MQTT topic from/tmp/collectd.conf, and send the MQTT topic along with received data to a queue manager via ctm_send_stats_to_qm( ) API. The queue manager may receive the data with MQTT topic, and send it to a MQTT server via qm_mqtt_send_message( ) API. The MQTT server may store telemetry data in a specified topic.

A connector source 502 in an analytics streaming platform 252 may connect to the MQTT server, read data from the topic, and convert the telemetry data from Protobuf format to Avro™ format. Avro™ is a row-based storage format that is widely used as a serialization platform. The Avro™ format stores the data definition (schema) in JSON format making it easy to read and interpret by any program. The data itself is stored in binary format making it compact and efficient.

After converting the telemetry data from Protobuf format to Avro™ format, the connector source 502 may send the converted data to connector sinks 506 via a data broker 504. Protobuf may be a known method of serializing structured data that is useful in developing programs to communicate with each other over a wire or for storing data.

The dashboard 256 may display the streamed telemetry data by querying the connector sinks 506 based on the visualization requirements.

Figure 6:
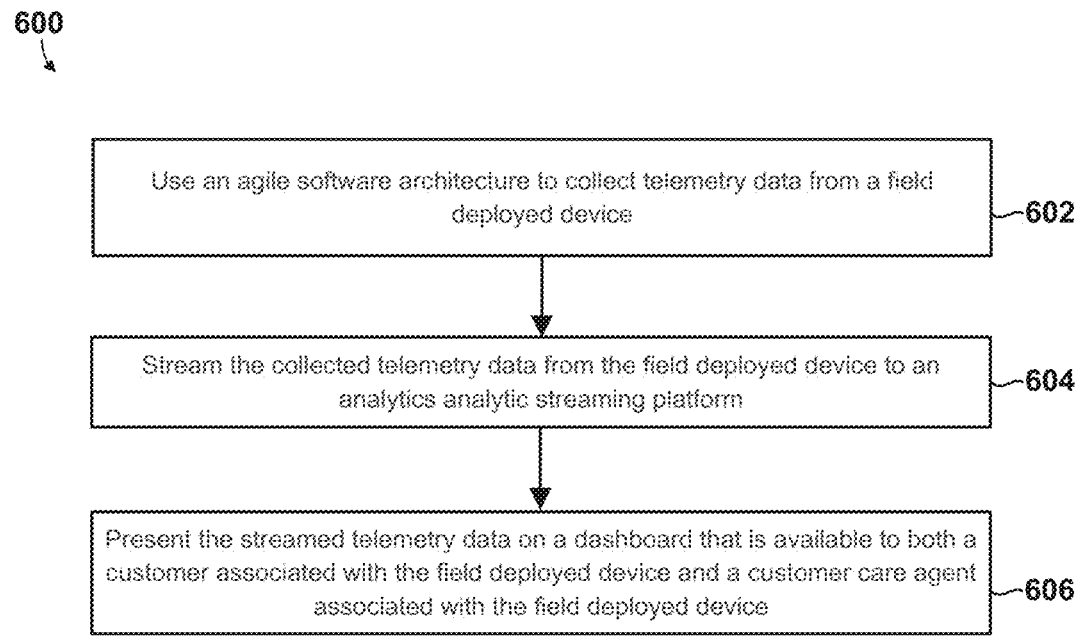
FIG. 6 is a process flow diagram illustrating a method of collecting and presenting telemetry data in accordance with some embodiments.

FIG. 6 illustrates a method 600 for collecting and presenting telemetry data in accordance with some embodiments. Method 600 may be performed by one or more processors in one or more computing systems/devices (e.g., field deployed device, CPE device, residential gateway, etc.). In block 602, the processor may use an agile software architecture to collect telemetry data from the field deployed device. In block 604, the processor may stream the collected telemetry data from the field deployed device to an analytics analytic streaming platform. In block 606, the processor (or a processor in a different device, such as UE device, etc.) may present the streamed telemetry data to a dashboard 256 component that is available to both a customer associated with the field deployed device and a customer care agent associated with the field deployed device.

Figure 7:
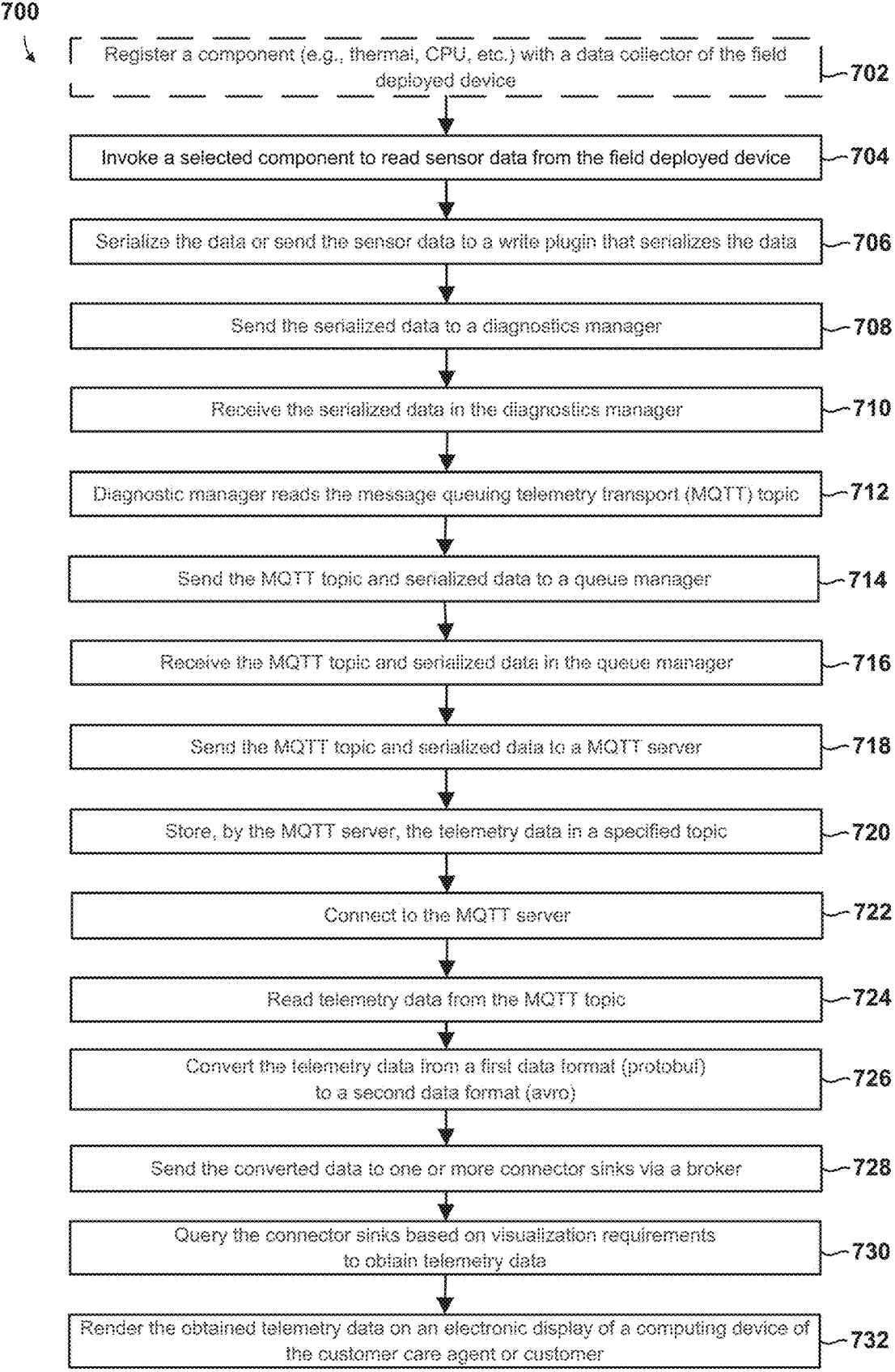
FIG. 7 is a process flow diagram illustrating another method of collecting and presenting telemetry data in accordance with some embodiments.

FIG. 7 illustrates a method 700 for collecting and presenting telemetry data in accordance with some embodiments. Method 700 may be performed by one or more processors in one or more computing systems/devices (e.g., field deployed device, CPE device, etc.).

In block 702, a processor in a field deployed device may register a component (e.g., thermal component 240, load component 242, CPU component 244, etc.) with a data collector (e.g., collectd 206 component, etc.) of the field deployed device. For example, a plugin may register with the collectd component during software development or update.

In block 704, the processor may invoke the selected component to read sensor data from the field deployed device based on pre-determined schedule plan, and submit the data to a write component (e.g., write_ctm 238 component). In block 706, the processor may serialize the data or send the sensor data to a write plugin that serializes the data. In block 708, the processor may send the serialized data to a diagnostics manager (e.g., Diagnostics Manager 306). In block 710, the diagnostics manager may receive the serialized data. In block 712, the diagnostics manager may read the message queuing telemetry transport (MQTT) topic. In block 714 the diagnostics manager may send the MQTT topic along with the received serialized data to a queue manager. In blocks 716 and 718, the queue manager may receive the MQTT topic and serialized data, and send the MQTT topic and serialized data to a MQTT server in the service provider's cloud network. In block 720, the MQTT server in the service provider's cloud network may store the telemetry data in a specified topic.

In blocks 722-728, a connector source of the service provider's streaming and analytics platform may connect to the MQTT server, read telemetry data from the MQTT topic, convert the telemetry data from a first data format (Protobuf) to a second data format (Avro™), and send the converted data to one or more connector sinks via a data broker. In block 730 and 732, a graphical display tool may query the connector sinks of the service provider's streaming and analytics platform based on the visualization requirements of the telemetry data, and render the obtained telemetry data on an electronic display of a computing device of the customer care agent or customer.

As mentioned above, some cable multiple system operators (MSOs) deploy a two-box solution for both residential and small-and-medium-size business (SMB) customers in which one box is an access CPE device (e.g., cable modem, an optical network unit, etc.), and the second box is a wireless router. A common configuration for such a two-box solution includes a D3.1 eMTA device, which may be connected to a hybrid fiber-coaxial (HFC) network via a coaxial cable on the wide area network (WAN) port and to a Wi-Fi router via an Ethernet cable on a local area network (LAN) port. For fiber-to-the-home (FTTH) deployments, the access CPE device may be an optical network unit (ONU) connected to a passive optical network (PON). A Wi-Fi router with a number of Wi-Fi APs or multiple Wi-Fi routers may also be used (e.g., in larger homes, etc.) for wireless mesh connectivity, resulting in improved data throughputs for all of the wirelessly connected devices in the home network.

In conventional solutions, the software stack on the above described D3.1 eMTA device is monolithic, or customized for each silicon vendor and/or original equipment manufacturer (OEM) vendor. Such monolithic software stacks do not provide any metrics about the health of the access CPE device or about the wirelessly connected clients. Such a monolithic software stack may also result in long and costly validation testing cycles before the new firmware that meets the cable operator's requirements can be deployed. Furthermore, many cable operators are moving toward a cloud-based infrastructure for both command/control and streaming telemetry, which a conventional access CPE device's monolithic software architecture may not be able to accommodate.

OpenWrt is an open-source project for embedded operating system based on Linux. OpenWrt is highly-flexible open-source operating system with a large ecosystem of vendors and developers that enable cable multiple system operators (MSOs) to rapidly develop new components, features and plugins that can be containerized. One of the key built-in benefits of an OpenWrt OS/kernel is a full carrier-grade IPv4/IPv6 routing functionality on the access CPE device with no need to redesign the hardware. Moving the routing functionality from the connected Wi-Fi router to an access CPE device enables cost optimization by using a generic Wi-Fi AP as the second box, and focusing the access point (AP) performance on the wireless connectivity in the home network.

To address some of the above described challenges of conventional solutions, the some embodiments include a field deployed device 202 that is configured or equipped with software systems that integrate an agile OpenWrt-based software stack with an OpenSync™ layer, a silicon vendor software development kit, and the message queue telemetry transport (MQTT) server architecture. The field deployed device 202 may also be configured to equipped with a cable modem and voice firmware.

The message queue telemetry transport (MQTT) protocol is a lightweight machine to-machine (M2M) transport communications protocol. A field deployed device 202 configured in accordance with the embodiments may stream telemetry data statistics to a dashboard (e.g., dashboard 256 component, etc.) via a MQTT server that is hosted in an OpenSync™ cloud (e.g., service provider's cloud network 250), which may forward the data to the cable multiple system operators (MSOs) streaming and analytics platform (e.g., streaming and analytics platform 252).

Some embodiments may include a MQTT server that is configured to support various forms of authentication and/or various data security mechanisms (e.g., using a script to generate security certificates).

Some embodiments may include a dashboard component (e.g., dashboard 256, etc.) that is a multi-platform open-source analytics and interactive visualization web application that users may customize to create complex monitoring dashboards (e.g., user interface screens 400, 420, etc.).

Some embodiments may include a cloud network (e.g., service operator's cloud network 250) that includes a network operations center (NOC) and an OpenSync™ controller for managing a network of OpenSync™-enabled devices. Cable operators may establish their own cloud network by obtaining an OpenSync™ source-code license. The cloud network may provide operator-friendly services, including: device and firmware management; inventory and billing system; network performance control; onboarding and provisioning of field-deployed devices; telemetry reporting and data analytics; and network operations and customer support. In some embodiments, the NOC may be configured to translate and communicate management commands in a single Wi-Fi access point (AP) network and in mesh multi-AP Wi-Fi network via open vSwitch database (OVSDB) distributed database commands. The OpenSync™ controller may be configured to utilize the open vSwitch (OVS) implementation and OpenFlow protocol for networking, and message queue telemetry transport (MQTT) protocol for receiving state and telemetry data from OpenSync™-enabled devices. Specifically, the OpenSync™ controller may provide the necessary command and control services such as: network status; internet protocol (IP) address; network mask; dynamic host configuration protocol (DHCP) status; parental control; speed test initiation and results; and reset and reboot device.

Some embodiments may include a field deployed device (e.g., field deployed device 202) that includes a smart remote agent (e.g., collectd 206 component, etc.), which may be configured to gather metrics from various sources, such as the operating system, applications, log-files and external devices. The smart remote agent may be configured to store such information and/or make it available over the network. These statistics may be used to monitor systems, find performance bottlenecks (i.e. performance analysis), and predict future system load (i.e. capacity planning).

In some embodiments, the smart remote agent may be configured to collect different types of telemetry data from one or more Wi-Fi routers.

In some embodiments, the smart remote agent's default reporting time interval may be 30 seconds. In some embodiments, the smart remote agent may be configured with another reporting time interval (e.g., 2 seconds, 1 minute, 10 minutes, 1 hour, each day, etc.).

In some embodiments, the smart remote agent may be configured to run specific tests, such as measuring the IPv4/IPv6 DOCSIS round-trip latency using an eMTALat component (e.g., eMTALat 219, etc.), reading the collected measurement data, and streaming the data to a service operator's streaming and analytics platform (e.g., streaming and analytics platform 252).

In some embodiments, the smart remote agent may be integrated with a silicon vendor's software development kit (e.g., Si Vendor SDK 210, etc.) and/or with an OpenWrt OS (e.g. OpenWrt kernel 212, etc.).

In some embodiments, the smart remote agent may be configured or equipped with a usCeMTA component (e.g., usCeMTA 222, etc.), which may be configured to pull all the DOCSIS upstream channel information (RF level, channel frequency, etc.) used by the device (e.g., field deployed device 202, etc.).

In some embodiments, the smart remote agent may be configured or equipped with a dsCeMTA component (e.g., dsCeMTA 224, etc.), which may be configured to pull all the DOCSIS downstream channel information used by the device.

In some embodiments, the smart remote agent may be configured or equipped with a latClient component (e.g., latClient 226, etc.), which may be configured to measure and report the round-trip latency from the device to each of the wirelessly connected devices in the home network based on their IP address or MAC address.

In some embodiments, the smart remote agent may be configured or equipped with a connClient component (e.g., connClient 228, etc.), which may be configured to measure and report the number of transmitted and received packets from each of the wirelessly connected devices in the home network.

In some embodiments, the smart remote agent may be configured or equipped with a specAnalyzer component (e.g., specAnalyzer 230, etc.), which may be configured to obtain the RF downstream and upstream spectrum of device (e.g., field deployed device 202, etc.).

In some embodiments, the smart remote agent may be configured or equipped with a eMTALat component (e.g., eMTALat 219, etc.), which may be configured to measure and report the minimum, maximum, and average round-trip DOCSIS latency between the device (e.g., field deployed device 202, etc.) and the connected CMTS. First, it may initiate a trace-route command to get CMTS IPv4 and IPv6 addresses. Then, it may start ICMP request and reply commands to measure the DOCSIS latency between the cable modem and CMTS, and store the test results in separate files for IPv4 and IPv6. The eMTALat component may also read results from these files and send them to write_ctm plugin (e.g., write_ctm 238), which may in turn send the measured DOCSIS latency results to the OpenSync™ layer's statistics manager (e.g., STATS Manager 304, etc.).

In some embodiments, the smart remote agent may be configured or equipped with a Wrtbwmon component (e.g., Wrtbwmon 234, etc.), which may be configured to run on Linux powered routers (e.g., OpenWRT, DD-WRT, Tomato, routers where shell access is available, etc.) and provide per user bandwidth monitoring capabilities, generate usage reports, and/or perform other similar operations.

In some embodiments, the smart remote agent may be configured or equipped with a Nmap component (e.g., Nmap 232, etc.), which may be configured to perform various operations for network discovery and security auditing. The Nmap component may also useful for tasks such as network inventory, managing service upgrade schedules, and monitoring host or service uptime. The Nmap component may use raw IP packets to determine what hosts are available on the network, what services (application name and version) those hosts are offering, what operating systems (and OS versions) they are running, what type of packet filters/firewalls are in use, and dozens of other characteristics.

In some embodiments, the smart remote agent may be configured or equipped with a write_ctm component (e.g., write_ctm 238) configured to call various collection components/plugins over a configurable time period. For example, the smart remote agent may include a collectd daemon that collects various statistics from the device for aggregation and forwarding to a desired destination. The write_ctm component may aggregate the stats, convert them to a Protobuf format, and send the collected telemetry data to the Openwork OpenSync™ layer's statistics manager test results via the OpenSync™ cloud. Table 1 summarizes the OpenSync™ manager functionality and their status. Some of the managers listed are required for basic operation, while the other listed managers are optional, depending on the desired functionality.

TABLE 1

Summary of Managers' Functionality and Status

| Manager Name | Manager Functionality | Manager Status |
|---|---|---|
| Diagnostics Manager (DM) | Responsible for spawning the rest of the OpenSync ™ managers and optionally monitoring them. It controls starting, stopping, restarting of the OpenSync ™ managers, and monitoring the reboot status of the OVSDB. The iPerf speed test software was developed and integrated into the DM such that the speed test can be initiated from the OpenSync ™ NOC, and the DS/US speed test results are sent to dashboard component. | Required for basic operation |
| Connection Manager (CM) | Responsible for establishing the backhaul connection and keeping connectivity to the cloud. | Required for basic operation |
| Network Manager (NM) | Responsible for managing all network related configuration and network status reporting. | Required for basic system network configuration |
| Wireless Manager | Not applicable to access CPE devices. Used in Wi-Fi routers to read and updated their configuration and state tables. | Required for basic system network configuration |
| Queue Manager (QM) | Responsible for aggregating reports from different OpenSync ™ Managers | Optional |
| Statistics Manager (SM) | Responsible for processing all requested wired and wireless statistics and sending results to the cloud. The configuration is done through OVSDB while MQTT is used for the data plane. All the telemetry health metrics mentioned below are collected by write_ctm component, and are transmitted to the SM, which forwards all the collected telemetry data to the QM. | Optional |
| OpenFlow Manager (OM) | If the OpenVSwitch is used on the device, then the OM is responsible for managing packet flow rules. | Optional |
| Log Manager (LM) | Responsible for collecting and uploading logs and system information upon the Cloud request (log pull) and for handling log severity setting for running modules. | Optional |
| Platform Manager (PM) | Responsible for covering specific platform features which can't be covered by other managers such as synchronization between device GUI and cloud, and cloud-managed device parental control. | Optional |

(e.g., STATS Manager 304, etc.). The statistics manager may forward the collected telemetry data to a queue manager (e.g., Queue Manager 310), which may Open Sync send the collected telemetry data to the cable MSO's streaming and analytics platform (e.g., platform 252) via the MQTT server. It should be noted that the smart remote agent component may also send string-formatted event notification based on system defined threshold levels. The write_ctm component may register its write API, and fetch data from the existing plugins on the expiration of every time period.

Generally, OpenSync™ is a cloud-agnostic open-source software that include many managers running as separate processes and performing their specific set of tasks. The software code of the Diagnostics Manager (DM) and STATS Manager (SM) may be updated for streaming the collected telemetry data and other test results such as the iPerf speed Some embodiments may initiate an iPerf speed test from the OpenSync™ network operations center (NOC). Submitting a speed test request from the NOC may send a message via Openflow to the field deployed device (access CPE device) and the speed test request may be detected on the device by the speed test handler in the OpenSync™ DM. The speed test handler may call a script on the device that in turn invokes an iPerf speed test with a pre-defined set of arguments. The speed test may be run once to collect the upstream test results, and once again to collect the downstream results. The speed test results from each test may be saved to files on the Access CPE device. The STeMTA collectd component/plugin (e.g., STeMTA 220, etc.) may processes the speed test results from the files, and deliver them to the MQTT server. The ability to initiate the iPerf speed test from the OpenSync™ NOC and review the collected speed test results would be very helpful to the Cable operators' call center to quickly address customers' issues.

Some embodiments may include a STeMTA component (e.g., STeMTA 220, etc.), which may be a new Speed Test plugin/component that is added to the collectd component. The STeMTA component may call an iPerf speedtest script to initiate the iPerf speed test on WAN port of the field deployed device. Once an iPerf speed test is completed, then the script may write the downstream and upstream speed test results to iPerf download and upload result files. The STeMTA component may read results from these two files and send them to the write_ctm plugin, which may in turn send the measured speed test results to the OpenSync™ statistics manager (e.g., STATS Manager 304).

Some embodiments may include a STLANeMTA component (e.g., STLANeMTA 221, etc.), which may be a new Speed Test plugin/component. The STLANeMTA component/plugin may call the iPerf LAN speedtest script to initiate the iPerf speed-test on LAN port of the field deployed device. Once iPerf speed-test is completed, the script may write the downstream and upstream speed test results to an output file. The STLANeMTA component may read results from this file and send to them to the write_ctm plugin/component, which may in turn send the measured speed test results to OpenSync™ statistics manager (e.g., STATS Manager 304).

Some embodiments may include one or several cloud-connectivity security features. For example, the field deployed device may be configured to use OpenSync™ device certificates to authenticate and connect to the OpenSync™ cloud, and to connect to the MQTT server in order to stream the collected telemetry data to the Cable operator's streaming and analytics platform (e.g., platform 252). In addition, a shell script in the device may be used to monitor all Secure Shell (SSH) and TELNET connections to the field deployed device, which may be reported to the dashboard (e.g., dashboard 256, etc.).

Some embodiments may be configured to form, generate, create, maintain, or support a telemetry data path from a device (e.g., field deployed device 202, etc.) to a dashboard (e.g., dashboard 256, etc.) via a cable MSO's streaming and analytics platform (e.g., platform 252). The collected telemetry data may be streamed to the MQTT server hosted on the cloud network (e.g., network 250), and then to the cable MSO's streaming and analytics platform (e.g., platform 252).

Some Cable MSO's network architectures may separate the control plane and the data plane as intelligence is no longer resident on hardware devices but rather on the network's software driven controllers where network analytic models may act on traffic behaviors, services flows, and configuration state to predict and respond in near real-time to the networks changing demands. The network architecture's data plane may include a cog platform, data distribution bus (DDB), and data governance platform. The cog platform may be a data engineering platform that builds enriched data sets called analytics data sets (ADSs), sometimes represented by a first normal form (1NF). These ADSs may be distributed across the operator's network, and used for data modeling and machine learning (ML). The DDB may be the initial point of data ingestion and the initial system where all data is classified as a data asset. The data governance platform may provide a framework for decisions and accountabilities within the corporate structures to manage and protect the data assets. Any raw data that is not governed as dictated by the data governance standards may be transformed for compliance with the standards.

As the Cable operators move their network's control plane to the cloud, their data plane may be maintained in various edge locations deeper into the network or with the customer's home network. Telemetry data in Protobuf format may be ingested by a connector source (e.g., connector source 502, etc.) for MQTT, which may be part of the data plane of the cable MSO's streaming and analytics platform (e.g., platform 252, etc.). A broker (e.g., broker 504) may receive the converted telemetry data from Protobuf to Avro™ format, and transmit the telemetry data to connector sinks (e.g., sinks 506, etc.). The telemetry data may be ingested by different data analytic tools, depending on the type of data. For example, an Elasticsearch (ELK) tool may ingest time-series data, while an MySQL tool ingests relational data before the telemetry data is displayed on a customized dashboard (e.g., dashboard 256, etc.).

The dashboard component may be designed or configured to concisely present all the different types of telemetry data to the Cable operator's care agent, and to focus the agent attention to any reported failures and unhealthy device metrics. The dashboard may be organized, hierarchical and color-coded. The dashboard may present key components, level 1 health metrics, and their operational status based on pre-determined threshold levels. The dashboard may display a geographical map of the customer location along with reported data telemetry results.

In the various embodiments, the dashboard component may include any or all of following information: router system information, home network traffic from all the wirelessly connected devices via the pods or access points, cable modem downstream/upstream channel information, radio frequency downstream and upstream spectrum information, downstream/upstream speed test results, security notifications and alarms information, a customer location map, voice health metrics, external battery backup unit (EBBU) metrics, access CPE device information, access CPE device reboot information, IPv4/IPv6 DOCSIS round-trip latency, and device event logs.

The router system information may include CPU utilization (%) in a given time period, free system memory (%) in a given time period, system load (%) in a given time period, networking information (e.g., IP address, network mask, DHCP status, etc.), instantaneous and average system temperature in a given time period, and/or average, minimum and/or maximum round-trip IPv4 and IPv6 latency in a selected period of time to the CMTS.

The home network traffic information may include the IPv4/IPv6 of the wirelessly connected client in home network, the number of transmitted and received packets for each device, the IPv4/IPv6 round-trip latency between the D3.1 eMTA and each of the connected clients, and cable modem downstream/upstream channel information. The cable modem downstream information may include channel ID, channel type, lock status, channel bonding status, received power level, SNR/MER, channel center frequency, channel width, modulation profile, etc. The cable modem upstream information may include channel ID, transmit power level, channel center frequency, channel width, channel bonding status, etc.

The radio frequency downstream and upstream spectrum information may include downstream/upstream RF signal power (dBmV) vs. frequency (MHz).

The downstream/upstream speed test results may include speed test results on the WAN port (e.g., iPerf server in the cable MSO's cloud) and/or on the LAN port (e.g., between iPerf server running on D3.1 eMTA and the connected home network's client).

The security notifications and alarms information may include security notifications (e.g., if someone is trying to temper with the Access CPE via unauthorized access to the device's management and control GUI via SSH, in which case the color-coded green status of the security notifications and alarms dashboard may change to either a color-coded orange or red to indicate an increased security risk) and collected metrics alarms (e.g., which may indicate that one or more red thresholds were violated, such as if the temperature of the device is significantly elevated and the device is about shut-down or go into energy saving mode).

The customer location map may provide the cable MSO's care agent with information identifying where the customer is located within the cable MSO's service area footprint.

The voice health metrics may include a phone line number, phone status (on/off hook), phone line IPv4 and IPv6 addresses, voice call start time, voice call end time, call duration, call failed, and phone line registration status.

The EBBU metrics may include manufacturer identity, hardware model number, software agent version, battery status, EBBU output voltage, estimated remaining charge capacity, and alarm description (On battery, Low battery, Depleted battery, EBBU shutdown in pending, EBBU shutdown is eminent, etc.).

The access CPE device information may include cable modem hardware version, software version, MAC address, serial number, IPv4 address and IPv6 address, cable modem system uptime, cable modem security status/type, cable modem connectivity state status/type, etc.

The access CPE device reboot information may include last device reboot event time, date, and count. The access CPE device reboot information may also include a last device reboot description.

The IPv4/IPv6 DOCSIS round-trip latency information may include IPv4 and IPv6 minimum, average, and maximum round-trip latency to the connected CMTS in a given period of time.

The device event logs may include device configuration events, DHCP warnings, DOCSIS events, etc.

In some embodiments, the dashboard may display Level 2 telemetry data. Level 2 telemetry data may show the status of each of the reported health metrics in a given period of time. For example, a dashboard may display the reported status of the devices system parameters, including system load, CPU utilization, system temperature, and free memory in the last hour. Each of these reported metrics may have a different set of threshold levels to indicate its healthy status. For example, a healthy CPU utilization may be below 75%, and color-coded green, while unhealthy CPU utilization may above 85%, and color-coded red. A CPU utilization between 75% up to 85% may color-coded orange. If all the level 2 system parameters are healthy, then the device system component (level 1) may turn green.

In some embodiments, the dashboard may display Level 3 telemetry data. Level 3 telemetry data shows the time behavior of each of the selected metrics in any given time frame. This type of telemetry reporting can be important when deeper insight into the reported metrics is needed to diagnose an issue or abnormal behavior of the device. For example, reported level 3 telemetry data may indicate that the time behavior of the CPU utilization reported in the last hour. The CPU utilization data may be collected based on a selected time interval, which may be 5 seconds. A low CPU utilization may be displayed. The average system load and CPU utilization may measure different things. The system load may be a measurement of how many tasks are waiting in a kernel run queue (not just CPU time but also disk activity) over the selected time period. The CPU utilization may be a measure of how busy the CPU is during the selected time period.

Level 3 telemetry data is particularly useful since machine learning models may be executed on the selected customer data based on the collected historical data to determine whether the current reported issue previously occurred, when it occurred, and provide suggested guidelines to the cable MSO's care agent how to mitigate this issue, particularly if this issue previously observed with other customers.

One of the challenges for the operator's care agent is to gain visibility into the customer's home network for network optimization and debugging field issues. This challenge is met by configuring the field deployed device (e.g., access CPE device) to function as a router, and connected to a Wi-Fi AP via Ethernet cable. For example, home network traffic parameters (level 2), including the number of transmitted and received packets by each wirelessly connected client in the home network based on their IP address or MAC address reported in the last hour, may be reported. Instead of using the connected client's IP address or MAC address, the actual client's identification and logo may be displayed on the dashboard component with the integration of a device fingerprinting agent (e.g., a commercial Artificial Intelligence (AI) agent, etc.). The client identification may include device name, device vendor, device model number, device type, device OS, etc. This may be a very useful feature for customers trying to diagnose their home network traffic. For example, customers may identify whether there is a specific client that consumes most of the bandwidth in the home network, and/or make changes to their home network configuration.

In addition, the average round-trip latency between the field deployed device each of the wirelessly connected client in the last hour may be reported. Level 3 home network traffic data may be obtained by selecting a specific client in the home network based on their IP address. For example, the number of transmitted and/or received packets vs. time by the selected client over the selected time interval can be displayed on the dashboard component.

Monitoring the DOCSIS channel information is also important to ensure robust operation of the field deployed device (e.g., cable modem) at the customer location. For example, the downstream DOCSIS channel information status, including the channel lock status, channel type, channel bonding status, channel center frequency, channel width, SNR threshold, and received power level, unerrored codewords, number of corrected codewords and uncorrectable codewords may all be displayed. Having access to such monitored historical data with machine learning models may significantly help to identify troubled devices in the field compared with other devices connected to the same CMTS.

Figure 8:
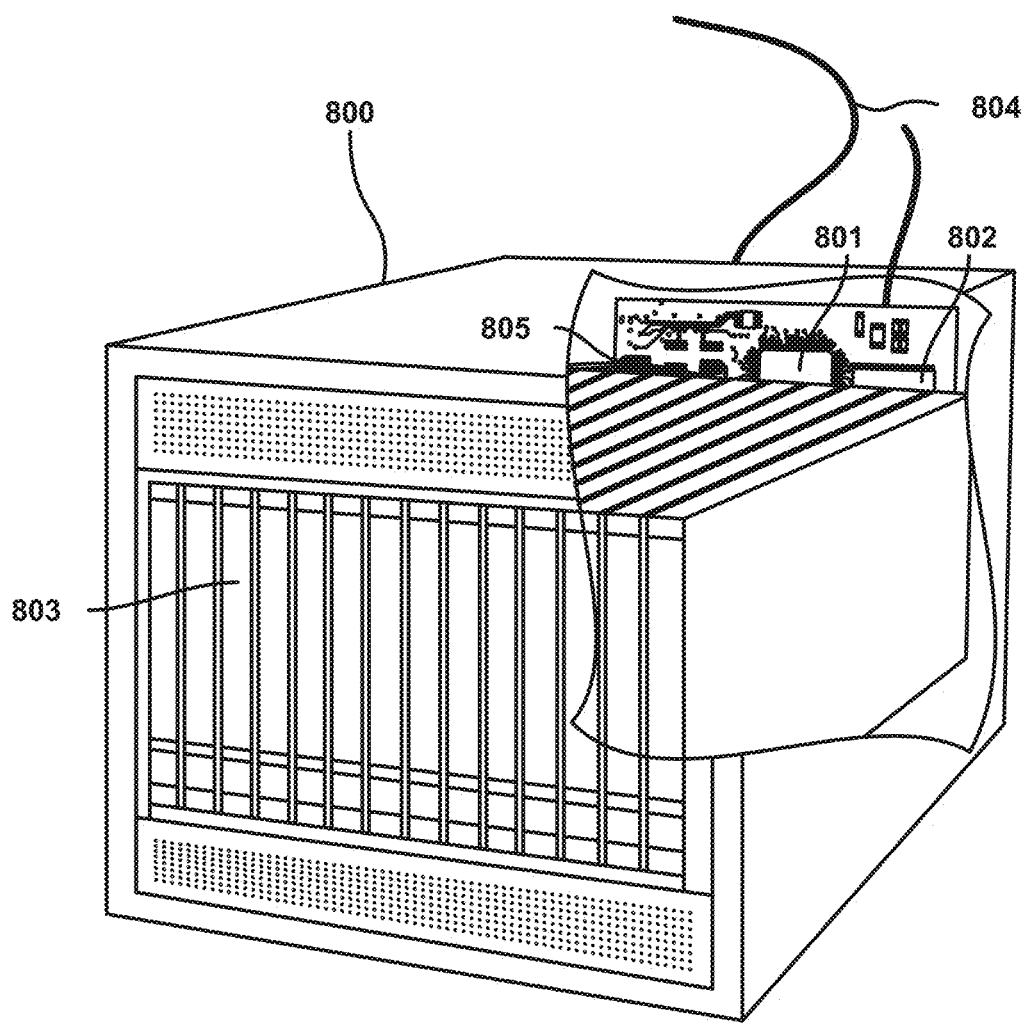
FIG. 8 is a component diagram of an example computing server device suitable for implementing the various embodiments.

Various embodiments may be implemented on any of a variety of commercially available computing devices, such as the computing device 800 illustrated in FIG. 8. Such a computing device 800 may include a processor 801 coupled to volatile memory 802 and a large capacity nonvolatile memory, such as a disk drive 803. The computing device 800 may also include network access ports 806 coupled to the processor 801 for establishing data connections with a network connection circuit 804 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for collecting telemetry data, comprising:
registering, by a field deployed device, a component with a data collector of the field deployed device;
invoking, by the field deployed device, the registered component to read sensor data from the field deployed device based on pre-determined schedule plan;
submitting, by the field deployed device, the sensor data to a write component;
serializing, by the field deployed device, the sensor data; and
sending, by the field deployed device, the serialized data to a diagnostics manager.

2. The method of claim 1, further comprising:
receiving, by a diagnostics manager processor in the diagnostics manager, the serialized data;
reading, by the diagnostics manager processor, a message queuing telemetry transport (MQTT) topic; and
sending, by the diagnostics manager processor, the MQTT topic along with the received serialized data to a queue manager.

3. The method of claim 2, further comprising:
receiving, by a queue manager processor in the queue manager, the MQTT topic and serialized data; and
sending, by the queue manager processor, the MQTT topic and serialized data to a MQTT server in a cloud network.

4. The method of claim 3, further comprising:
storing, by a MQTT processor in the MQTT server, the telemetry data in a specified topic.

5. The method of claim 4, further comprising:
establishing, by a connector source processor in a connector source, a connection to the MQTT server;
reading, by the connector source processor, the telemetry data from the MQTT topic;
converting, by the connector source processor, the telemetry data from a first data format to a second data format; and
sending, by the connector source processor, the converted data to one or more connector sinks via a data broker.

6. The method of claim 5, further comprising:
querying, by a graphical display tool processor in a graphical display tool, the connector sinks based on visualization requirements of the telemetry data; and
rendering, by the graphical display tool processor, the obtained telemetry data on an electronic display of a computing device of the customer care agent or customer.

7. The method of claim 1, wherein registering the component with the data collector of the field deployed device comprises registering a thermal component, a load component, or a central processing unit (CPU) component with the data collector of the field deployed device.

8. A field deployed device, comprising:
a processor configured with processor-executable instructions to:
register a component with a data collector of the field deployed device;
invoke the registered component to read sensor data from the field deployed device based on pre-determined schedule plan;
submit the sensor data to a write component;
serialize the sensor data; and
send the serialized data to a diagnostics manager.

9. A non-transitory computer readable storage medium having stored thereon processor-executable software instructions configured to cause a processor in a field deployed device to perform operations for collecting telemetry data, the operations comprising:
registering a component with a data collector of the field deployed device;
invoking the registered component to read sensor data from the field deployed device based on pre-determined schedule plan;
submitting the sensor data to a write component;
serializing the sensor data; and
sending the serialized data to a diagnostics manager.

10. A system, comprising:
a field deployed device comprising a field deployed device processor coupled to a data collector;
a diagnostics manager comprising a diagnostics manager processor;
a queue manager comprising a queue manager processor;
a message queuing telemetry transport (MQTT) server comprising a MQTT server processor;
a connector source comprising a connector source processor; and
a graphical display tool comprising a graphical display tool processor.

11. The system of claim 10, wherein the field deployed device processor is configured with processor-executable instructions to:
register a component with a data collector of the field deployed device;
invoke the registered component to read sensor data from the field deployed device based on pre-determined schedule plan;
submit the sensor data to a write component;
serialize the sensor data; and
send the serialized data to the diagnostics manager.

12. The system of claim 11, wherein the diagnostics manager processor is configured with processor-executable instructions to:
receive the serialized data;
read a MQTT topic; and
send the MQTT topic along with the received serialized data to the queue manager.

13. The system of claim 12, wherein the queue manager processor is configured with processor-executable instructions to:
receive the MQTT topic and serialized data; and
send the MQTT topic and serialized data to the MQTT server in a cloud network.

14. The system of claim 13, wherein the MQTT server processor is configured with processor-executable instructions to:
store the telemetry data in a specified topic.

15. The system of claim 14, wherein the connector source processor is configured with processor-executable instructions to:
establish a connection to the MQTT server;
read the telemetry data from the MQTT topic;
convert the telemetry data from a first data format to a second data format; and
send the converted data to one or more connector sinks via a data broker.

16. The system of claim 15, wherein the graphical display tool processor is configured with processor-executable instructions to:
query the one or more connector sinks based on visualization requirements of the telemetry data; and
render the obtained telemetry data on an electronic display of a computing device.

17. The system of claim 10, wherein the field deployed device processor is configured with processor-executable instructions to register the component with the data collector of the field deployed device by registering a thermal component, a load component, or a central processing unit (CPU) component with the data collector of the field deployed device.

* * * * *